(12) United States Patent
Shaw

(10) Patent No.: US 7,326,471 B2
(45) Date of Patent: Feb. 5, 2008

(54) CORNER MOLDING COMPOSITIONS FOR AUTOMOTIVE SEALANT SYSTEMS

(75) Inventor: Karla Drew Shaw, Copley, OH (US)

(73) Assignee: Advanced Elastomer Systems, L.P., Akron, OH (US)

(*) Notice: Subject to any disclaimer, the term of this patent is extended or adjusted under 35 U.S.C. 154(b) by 315 days.

(21) Appl. No.: 10/967,078

(22) Filed: Oct. 15, 2004

(65) Prior Publication Data

US 2006/0084762 A1    Apr. 20, 2006

(51) Int. Cl.
*B32B 27/08* (2006.01)

(52) U.S. Cl. ...................... 428/516; 428/519

(58) Field of Classification Search ............... 428/516, 428/519
See application file for complete search history.

(56) References Cited

U.S. PATENT DOCUMENTS

| | | | |
|---|---|---|---|
| 4,186,240 A * | 1/1980 | Matsuda et al. | 428/349 |
| 5,349,005 A | 9/1994 | Tanaka | |
| 5,766,703 A * | 6/1998 | Mori et al. | 428/31 |
| 6,110,546 A * | 8/2000 | Honda et al. | 428/31 |
| 6,187,420 B1 * | 2/2001 | Tajima et al. | 428/213 |
| 6,245,856 B1 | 6/2001 | Kaufman | |
| 6,288,171 B2 | 9/2001 | Finerman | |
| 6,340,531 B1 * | 1/2002 | Konda et al. | 428/516 |
| 6,342,565 B1 | 1/2002 | Cheng | |
| 6,407,174 B1 | 6/2002 | Ouhadi | |
| 6,500,563 B1 * | 12/2002 | Datta et al. | 428/521 |
| 6,525,157 B2 | 2/2003 | Cozewith | |
| 6,642,316 B1 | 11/2003 | Datta | |
| 6,713,520 B2 | 3/2004 | Sahnoune | |
| 2004/0140625 A1 * | 7/2004 | Valls, Jr. | 277/549 |
| 2006/0084762 A1 * | 4/2006 | Shaw | 525/191 |
| 2006/0100379 A1 * | 5/2006 | Ouhadi | 525/240 |
| 2006/0199905 A1 * | 9/2006 | Hughes et al. | 525/191 |
| 2006/0199911 A1 * | 9/2006 | Markovich et al. | 525/192 |
| 2006/0235159 A1 * | 10/2006 | Datta et al. | 525/240 |

FOREIGN PATENT DOCUMENTS

| | | |
|---|---|---|
| EP | 0 601 790 | 6/1994 |
| EP | 0 735 091 | 10/1996 |
| EP | 1 195 404 | 4/2002 |
| EP | 1 288 256 | 3/2003 |
| JP | 2003-3023 A | 1/2003 |
| WO | WO 02/051634 A1 | 7/2002 |
| WO | WO 03/000492 | 1/2003 |
| WO | WO 03/000492 A1 * | 1/2003 |

* cited by examiner

*Primary Examiner*—Sheeba Ahmed
(74) *Attorney, Agent, or Firm*—Shawn H. Foster; Kevin M. Faulkner

(57) ABSTRACT

An automotive sealant composite structure is provided. The composite structure includes a first piece comprising a first elastomeric component that includes an at least partially crosslinked rubber, a first olefinic thermoplastic resin component, and a second olefinic thermoplastic resin component. The second olefinic thermoplastic resin component includes a propylene copolymer that has (i) 60 wt % or more units derived from propylene, (ii) isotactically arranged propylene derived sequences and (iii) a heat of fusion less than 45 J/g. The composite structure also includes a second piece at least partially adhered to the first piece. Preferably, the second piece includes one or more thermoset ethylene copolymer rubbers. Preferably, the first piece is a corner piece and the second piece is a straight piece at least partially adhered to the corner piece, together constituting a vehicular window seal structure.

19 Claims, No Drawings

CORNER MOLDING COMPOSITIONS FOR AUTOMOTIVE SEALANT SYSTEMS

BACKGROUND

1. Field of Invention

Embodiments described generally relate to composite structures comprising thermoplastic vulcanizates and articles made therefrom.

2. Description of Related Art

Thermoplastic vulcanizates (TPVs) may be characterized by finely divided rubber particles dispersed within a plastic matrix. These rubber particles are crosslinked to promote elasticity. As such, TPVs exhibit the processing properties of the plastic and the elasticity of the rubber.

TPVs are conventionally produced by dynamic vulcanization. Dynamic vulcanization is a process whereby a rubber component is crosslinked or vulcanized within a blend of at least one non-vulcanizing polymer component while undergoing mixing or masticating at some elevated temperature. Preferably, the temperature of this curing step is greater than the melt temperature of the non-vulcanizing polymer component.

TPVs have been used to form composite structures for use in automotive, industrial, and consumer markets. Some of those uses require the adhesion of a TPV component to other materials to form a completed structure. Sufficient adhesion of which is difficult to obtain and difficult to maintain depending on the materials to be adhered, the adhering conditions, as well as the environment or conditions of use. For example, WO 02/051634 discloses a two component composite structure where one of the polymer structures is made of EPDM blended with an effective amount of semicrystalline random adhesive copolymer, and the other polymer structure is made of a blend of dynamically vulcanized EPDM dispersed in a matrix of a thermoplastic polyolefin polymer. WO 02/051634 also discloses that the second polymer structure may be blended with the semicrystalline random adhesive copolymer. EP 0 601 790 discloses a two-layer sheet where each layer is made from an alpha olefin copolymer rubber and a polyolefin resin. The first layer or "skin layer" is partially crosslinked, and the second layer or "back surface layer" is non-crosslinked. EP 0 601 790 discloses that the polyolefin resin is a homopolymer of ethylene or propylene, or copolymers of ethylene or propylene with small amounts of other polymeric monomers.

SUMMARY

An automotive sealant composite structure is provided. In one or more embodiments, the composite structure includes a first piece comprising a first elastomeric component that includes an at least partially crosslinked rubber, a first olefinic thermoplastic resin component, and a second olefinic thermoplastic resin component. The second olefinic thermoplastic resin component includes a propylene copolymer that has (i) 60 wt % or more units derived from propylene, (ii) isotactically arranged propylene derived sequences and (iii) a heat of fusion less than 45 J/g. The composite structure also includes a second piece at least partially adhered to the first piece. The second piece includes a second elastomeric component that comprises one or more thermoset ethylene copolymer rubbers and includes less than 5 wt % of an olefinic thermoplastic resin.

In one or more embodiments above, the first piece is a corner piece in an automotive window seal construction, and the second piece is a straight piece at least partially adhered to the corner piece. Preferably, the straight piece includes a second elastomeric component that comprises one or more thermoset ethylene copolymer rubbers and includes less than 5 wt % of an olefinic thermoplastic resin.

In one or more embodiments above, the automotive sealant composite structure is a vehicular sealant composite structure. Preferably, the composite structure is useful for molded corners, molded end caps, glass run channels, trunk seals, tailgate seals, cowl seals, gap fillers, glass encapsulation, cut line seals, door seals, hood-to-radiator seals, windshield seals, sunroof seals, roof line seals, rear window seals, rocker panels, sashes, and belt-line seals.

DETAILED DESCRIPTION

The first elastomeric component is a thermoplastic vulcanizate. The term "thermoplastic vulcanizate composition" (also referred to as simply thermoplastic vulcanizate or TPV) is broadly defined as any material that includes a dispersed, at least partially vulcanized, rubber component; a thermoplastic resin component; and an additive oil. A TPV material may further include other ingredients, other additives, or both.

The term "vulcanizate" means a composition that includes some component (e.g., rubber component) that has been vulcanized. The term "vulcanized" is defined herein in its broadest sense, as reflected in any issued patent, printed publication, or dictionary, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." Also, in at least one specific embodiment, the term vulcanized refers to more than insubstantial vulcanization, e.g., curing (crosslinking) that results in a measurable change in pertinent properties, e.g., a change in the melt flow index (MFI) of the composition by 10% or more (according to any ASTM-1238 procedure). In at least that context, the term vulcanization encompasses any form of curing (crosslinking), both thermal and chemical, that can be utilized in dynamic vulcanization.

The term "dynamic vulcanization" means vulcanization or curing of a curable rubber blended with a thermoplastic resin under conditions of shear at temperatures sufficient to plasticize the mixture. In at least one embodiment, the rubber is simultaneously crosslinked and dispersed as microsized particles within the thermoplastic resin component. Depending on the degree of cure, the rubber to thermoplastic resin component ratio, compatibility of the rubber and thermoplastic resin component, the kneader type and the intensity of mixing (shear rate), other morphologies, such as co-continuous rubber phases in the plastic matrix, are possible.

As the term is used herein, a "partially vulcanized" rubber is one wherein more than 5 weight percent (wt %) of the crosslinkable rubber is extractable in boiling xylene, subsequent to vulcanization (preferably dynamic vulcanization), e.g., crosslinking of the rubber phase of the thermoplastic vulcanizate. For example, at least 5 wt % and less than 20 wt % or 30 wt % or 50 wt % of the crosslinkable rubber may be extractable from the specimen of the thermoplastic vulcanizate in boiling xylene. The percentage of extractable rubber can be determined by the technique set forth in U.S. Pat. No. 4,311,628, and the portions of that patent referring to that technique are hereby incorporated by reference.

Preferably, the percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight the weight of the soluble components, other than the rubber to be vulcanized, such as extender oils, plasticizers and components of the compositions soluble in organic solvent, as well as that rubber component that it is not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition, up to about 5 weight percent, typically between about 0.5 to about 2.0 weight percent, of EPDM rubber is soluble in refluxing xylene.

A "fully vulcanized" (or fully cured or fully crosslinked) rubber is one wherein less than 5 weight percent (wt %) of the crosslinkable rubber is extractable in boiling xylene subsequent to vulcanization (preferably dynamic vulcanization), e.g., crosslinking of the rubber phase of the thermoplastic vulcanizate. Preferably, 4 wt % or less, or 3 wt % or less, or 2 wt % or less, or 1 wt % or less of the crosslinkable rubber is extractable in boiling xylene.

Rubber Component

In one or more embodiments, the rubber component contains an ethylene copolymer rubber. The "ethylene copolymer rubber" may be any ethylene-containing rubber such as ethylene-propylene copolymer rubber (EPR), ethylene-propylene-diene (EPDM) rubber, and EPDM-type rubbers, for example. An EPDM-type rubber can be a terpolymer derived from the polymerization of ethylene and at least one different monoolefin monomer having from 3 to 10 carbon atoms, preferably 3 to 4 carbon atoms, and at least one polyunsaturated olefin having from 5 to 20 carbon atoms. Those monoolefins desirably have the formula $CH_2=CH-R$ where R is H or an alkyl of 1-12 carbon atoms and is preferably propylene. Desirably the repeat units from ethylene and the at least one monoolefin (and preferably from ethylene and propylene) are present in the polymer in weight ratios of 25:75 to 75:25 (ethylene:propylene) and constitute from about 90 to about 99.6 weight percent of the polymer. The polyunsaturated olefin can be a straight chained, branched, cyclic, bridged ring, bicyclic, fused ring bicyclic compound etc., and preferably is a nonconjugated diene. Repeat units from the nonconjugated polyunsaturated olefin are preferably from about 0.4 to about 10 weight percent of the rubber.

Thermoplastic Resin Component

In one or more embodiments, the thermoplastic resin component includes an olefinic thermoplastic resin. The "olefinic thermoplastic resin" may be any material that is not a "rubber" and that is a polymer or polymer blend considered by persons skilled in the art as being thermoplastic in nature, e.g., a polymer that softens when exposed to heat and returns to its original condition when cooled to room temperature. The olefinic thermoplastic resin component may contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins may be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the olefinic thermoplastic resin component is unvulcanized or non cross-linked.

In one or more embodiments, the olefinic thermoplastic resin component contains polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene may also include atactic sequences or syndiotactic sequences, or both. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ α-olefins. As noted elsewhere herein, certain polypropylenes have a high MFI (e.g., from a low of 10, or 15, or 20 g/10 min to a high of 25 to 30 g/10 min. Others have a lower MFI, e.g., "fractional" polypropylenes which have an MFI less than 1.0. Those with high MFI may be preferred for ease of processing or compounding.

In one or more embodiments, the olefinic thermoplastic resin component is or includes isotactic polypropylene. Preferably, the olefinic thermoplastic resin component contains one or more crystalline propylene homopolymers or copolymers of propylene having a melting temperature of from 110° C. to 170° C. or higher as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such olefinic thermoplastic resin components and methods for making the same are described in U.S. Pat. No. 6,342,565.

The term "random polypropylene" as used herein broadly means a single phase copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

Additive Oil

The term "additive oil" includes both "process oils" and "extender oils." For example, "additive oil" may include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene, e.g., products sold under the trademark Parapol®. Additive oils other than petroleum based oils can also be used, such as oils derived from coal tar and pine tar, as well as synthetic oils, e.g., polyolefin materials (e.g., SpectraSyn™, supplied by ExxonMobil Petroleum & Chemical). Certain rubber components (e.g., EPDMs, such as Vistalon 3666) include additive oil that is preblended before the rubber component is combined with the thermoplastic. The type of additive oil utilized will be that customarily used in conjunction with a particular rubber component.

The ordinarily skilled chemist will recognize which type of oil should be used with a particular rubber, and also be able to determine the amount (quantity) of oil. The additive oil can be present in amounts from about 5 to about 300 parts by weight per 100 parts by weight of the blend of the rubber and isotactic polypropylene components. The amount of additive oil may also be expressed as from about 30 to 250 parts, and more desirably from about 70 to 200 parts by weight per 100 parts by weight of the rubber component. Alternatively, the quantity of additive oil can be based on the total rubber content, and defined as the ratio, by weight, of additive oil to total rubber and that amount may in certain cases be the combined amount of process oil (typically added during manufacturing of TPV before and/or after curing the rubber) and extender oil (typically added in the rubber during its manufacturing). The ratio may range, for example, from about 0 to about 4.0/1. Other ranges, having any of the following lower and upper limits, may also be utilized: a lower limit of 0.1/1, or 0.6/1, or 0.8/1, or 1.0/1, or 1.2/1, or 1.5/1, or 1.8/1, or 2.0/1, or 2.5/1; and an upper limit (which may be combined with any of the foregoing lower limits) of 4.0/1, or 3.8/1, or 3.5/1, or 3.2/1, or 3.0/1, or 2.8/1. Larger amounts of additive oil can be used, although the deficit is often reduced physical strength of the composition, or oil weeping, or both.

Rubber Curing Agent

Any curative that is capable of curing or crosslinking the rubber component may be used. Depending on the rubber employed, certain curatives may be preferred. Illustrative curatives include, but are not limited to, phenolic resins, peroxides, maleimides, sulfur containing curatives, and silicon-containing curatives. Illustrative Phenolic resins are described in U.S. Pat. Nos. 2,972,600; 3,287,440; 4,311,628; and 6,433,090. A preferred phenolic resin curative is an octylphenol-formaldehyde resin sold commercially as SP-1045 from Schenectady International, Inc. Illustrative peroxide curatives are disclosed in U.S. Pat. No. 5,656,693. Useful silicon-containing curatives include silicon hydride compounds having at least two SiH groups. Illustrative silicon hydride compounds include, but are not limited to, methylhydrogen polysiloxanes, methylhydrogen dimethylsiloxane copolymers, alkyl methyl polysiloxanes, bis(dimethylsilyl)alkanes, bis(dimethylsilyl)benzene, and mixtures thereof.

Other Additives

The term "other additives" may include, but is not limited to, particulate fillers, lubricants, antioxidants, antiblocking agents, stabilizers, anti-degradants, anti-static agents, waxes, foaming agents, pigments, flame retardants, processing aids, adhesives, tackifiers, plasticizers, wax, and discontinuous fibers (such as world cellulose fibers). Exemplary particulate fillers are carbon black, silica, titanium dioxide, calcium carbonate, colored pigments, clay, and combinations thereof. When non-black fillers are used, it may be desirable to include a coupling agent to compatibilize the interface between the non-black fillers and polymers. Desirable amounts of carbon black, or other colorants, when present, are from about 5 to about 250 parts by weight per 100 parts by weight of rubber.

Propylene Copolymer

In one or more embodiments, the olefinic thermoplastic resin component includes a "propylene copolymer." A "propylene copolymer" includes at least two different types of monomer units, one of which is propylene. Suitable monomer units include, but are not limited to, ethylene and higher α-olefins ranging from $C_4$ to $C_{20}$, such as, for example, 1-butene, 4-methyl-1-pentene, 1-hexene or 1-octene and 1-decene, or mixtures thereof, for example. Preferably, ethylene is copolymerized with propylene, so that the propylene copolymer includes propylene units (units on the polymer chain derived from propylene monomers) and ethylene units (units on the polymer chain derived from ethylene monomers).

In one or more embodiments, the propylene copolymer contains at least 75 wt % of propylene-derived units. In one or more embodiments, the propylene copolymer contains from 75 wt % to 95 wt % of propylene-derived units. In one or more embodiments, the propylene copolymer contains from 80 wt % to 90 wt % of propylene-derived units. In one or more embodiments, the propylene copolymer can consist essentially of from 80 to 95 wt % repeat units from propylene and from 5 to 20 wt % of repeat units from one or more unsaturated olefin monomers having 2 or 4 to 12 carbon atoms.

Preferably, the propylene copolymer has crystalline regions interrupted by non-crystalline regions. The non-crystalline regions may result from regions of non-crystallizable polypropylene segments, the inclusion of comonomer units, or both. In one or more embodiments, the propylene copolymer has a propylene-derived crystallinity that is isotactic, syndiotactic, or a combination thereof. In a preferred embodiment, the propylene copolymer has isotactic sequences. The presence of isotactic sequences can be determined by NMR measurements showing two or more propylene derived units arranged isotactically. Such isotactic sequences may, in some cases be interrupted by propylene units that are not isotactically arranged or by other monomers that otherwise disturb the crystallinity derived from the isotactic sequences.

In one or more embodiments, the propylene-derived units of the propylene copolymer have an isotactic triad fraction of about 65% to about 99%. In one or more embodiments, the propylene-derived units of the propylene copolymer have an isotactic triad fraction of about 70% to about 98%. In one or more embodiments, the propylene-derived units of the propylene copolymer have an isotactic triad fraction of about 75% to about 97%.

Due to the introduction of errors in the insertion of propylene and/or by the presence of comonomer, the crystallinity and the melting point of the propylene copolymer are reduced compared to highly isotactic polypropylene. For example, the propylene-derived crystallinity of the propylene copolymer may range from about 2% to about 65% in one embodiment and from about 5% to about 40% in another embodiment as measured by Differential Scanning Calorimetry (DSC).

The crystallinity of the propylene copolymer can also be expressed in terms of "heat of fusion," measured using a Differential Scanning Calorimetry (DSC) test, most preferably in accordance with ASTM E-794-95. Preferably, about 6 mg to about 10 mg of a sheet of the polymer to be tested is pressed at approximately 200° C. to 230° C., then removed with a punch die and annealed at room temperature for 48 hours. At the end of that period, the sample is placed in a Differential Scanning Calorimeter (Perkin Elmer 7 Series Thermal Analysis System) and cooled to about −50° C. to −70° C. The sample is heated at about 10° C./min to attain a final temperature of about 180° C. to about 200° C. The thermal output is recorded as the area under the melting peak(s) of the sample, which is typically at a maximum peak at about 30° C. to about 175° C. and occurs between the temperatures of about 0° C. and about 200° C. The thermal output is measured in Joules as a measure of the heat of fusion.

The propylene copolymer may have a heat of fusion ranging broadly from 1.0 J/g to 90 J/g; or more narrowly from 2 J/g to 40 J/g; or from 5 J/g to 35 J/g; or from 7 J/g to 25 J/g. In one or more specific embodiments, the propylene copolymer has a heat of fusion of 75 J/g or less, or 50 J/g or less, or 35 J/g or less. Preferably, the propylene copolymer has a heat of fusion less than 45 J/g.

The "melting point" can be measured using the DSC test described above. Using the DSC test, the melting point is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak may be at a low temperature and be relatively flat, making it difficult to determine the precise peak location. Furthermore, as with the DSC method, the peak location may be influenced by annealing and relaxation treatments. Therefore, it is recommended that the sample pretreatment procedure stated above for the DSC be followed.

The propylene copolymer may have any one of the following melting points, ranging from a lower limit of 25° C., or 30° C., or 35° C., or 40° C., or 45° C., or 50° C., to a higher limit of 105° C., or 100° C., or 95° C., or 90° C., or 85° C., or 80° C., or 85° C., or 80° C., or 75° C., or 70° C. In other specific embodiments, the melting point of the propylene copolymer can be expressed as any one of a selection of ranges, e.g., ranges of from 30° C. to 70° C. or from 40° C. to 50° C.

The crystallinity interruption described above may be predominantly controlled by the incorporation of the non-propylene monomer units. Accordingly, the comonomer content of the propylene copolymer may range from about 5 wt % to about 30 wt % in one embodiment and from about 8 wt % to about 30 wt % in another embodiment and from about 8 wt % to about 15 wt % in still another embodiment. In one or more of the compositions described herein, the propylene copolymer can have a comonomer content of greater than 8 wt %; or greater than 10 wt %; or greater than 12 wt %; or greater than 15 wt %.

Furthermore, the propylene-derived crystallinity of the propylene copolymer can be selected to ensure the desired compatibility with the other ingredients of the TPV composition, e.g., with the other polymers in the thermoplastic resin component, as well as with the rubber component and additives. In a preferred aspect, the propylene-derived crystallinity is selected relative to any polypropylene resin present in the thermoplastic resin component. In some embodiments, the tacticity of the propylene copolymer and the tacticity of the thermoplastic resin component (which may include two or more different polypropylene polymers) may be the same or substantially the same. By "substantially" it is meant that these two components have at least 80% of the same tacticity. In another embodiment, the components have at least 90% of the same tacticity. In still another embodiment, the components have at least 100% of the same tacticity. Even if the components are of mixed tacticity, e.g., being partially isotactic and partially syndiotactic, the percentages in each should be at least about 80% the same as the other component in at least one or more embodiments.

In one or more embodiments, the propylene copolymer is made using random polymerization methods, including those described in U.S. Pat. Nos. 6,288,171; 6,525,157; 5,001,205; WO 96/33227; WO 97/22639; U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; 5,677,375; 5,693,727; 3,248,179; 4,613,484; 5,712,352; EP-A-0 794 200; EP-A-0 802 202; and EP-B-634 421. However, the propylene copolymer is not limited by any particular polymerization method. Suitable polymerization methods include gas phase, slurry, and solution, for example.

The propylene copolymer is also not limited by any or any particular type of reaction vessel. The propylene copolymer may in certain embodiments be formed in a single reactor. The propylene copolymer may in certain embodiments be formed in one or more series reactors (e.g., two or more reactors arranged in series). The propylene copolymer may in certain embodiments be formed in a batch reactor. Preferably, the continuous polymerization methods have sufficient back-mixing such that there are no concentration gradients within the reactor. Preferably, the propylene copolymer is formed using solution polymerization (as opposed to slurry or gas-phase polymerization) such that the catalyst system exists in a single-phase environment.

The propylene copolymer is not limited by any particular catalyst or catalyst system. In one or more embodiments, the catalyst system may include one or more transition metal compounds and one or more activators. Multiple activators may be used, including using mixtures of alumoxanes or aluminum alkyls with ionizing activators. When alumoxane or aluminum alkyl activators are used, the combined pre-catalyst-to-activator molar ratio is from 1:5000 to 10:1. When ionizing activators are used, the combined pre-catalyst-to-activator molar ratio is from 10:1 to 1:10. In one or more embodiments, the one or more catalyst systems disclosed in U.S. Patent Application 20040024146 published Feb. 5, 2004, may be used. In one or more embodiments, nonmetallocene, metal-centered, heteroaryl ligand catalyst systems as described in U.S. Patent Application 20030204017 published Oct. 30, 2003, may be used.

Preferably, the propylene copolymer is made in the presence of a metallocene catalyst system. As a nonlimiting example, illustrative metallocene catalyst systems may include, but are not limited to, a bis-indenyl compound, particularly a bridged bis-indenyl compound, and even more particularly a bridged bis-indenyl compound without any 2-substitutions. Alternatively, however, in one or more specific embodiments, any propylene copolymer used in an elastomeric structure may be prepared using a single site catalyst capable of permitting tactic insertion. For example, in at least certain embodiments, a polymer made in accordance with the disclosure of WO 03/0404201, owned by Dow Chemical Company, may qualify as a "propylene copolymer."

In one or more embodiments, the propylene copolymer has a Shore A hardness of less than about 90. In one or more embodiments, the propylene copolymer a Shore A hardness of about 45 to about 90. In one or more embodiments, the propylene copolymer has a Shore A hardness of about 55 to about 80.

In one or more embodiments, the propylene copolymer may have a molecular weight distribution (MWD) $M_w/M_n$ ranging from 1.5 to 40; or from 2 to 20; or from 2 to 10; or from 2 to 5. In one or more embodiments, the propylene copolymer may have a number average molecular weight of from 10,000 to 5,000,000; or from 40,000 to 300,000; or from 80,000 to 200,000, as determined by gel permeation chromatography (GPC). In one or more embodiments, the propylene copolymer may have a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol. Further, the propylene copolymer may have a Mooney viscosity (ML (1+4)@125° C.) from a low of 50, or 60, or 75, to a high of 80, or 90, or 100.

Process Description

Any process for making TPVs may be employed. In one or more embodiments, the individual materials and components, such as the one or more rubber components, thermoplastic resin components, additive oils, curatives, other additives, etc., may be blended by melt-mixing in any order in a mixer heated to above the melting temperature of the thermoplastic resin component.

The one or more components, thermoplastic resin components, and curing agents can be added to a heated mixer as individual feed streams, as a tumbled blend, or as a masterbatch. The one or more thermoplastic resin components can be added before cure or divided in any proportions between before cure and after cure. The additive oil, e.g. process oil, can be added during mastication before cure, after cure, or divided in any proportions between before cure and after cure.

Preferably, the one or more curing agents are incorporated into the melt within a target range of melt temperature over a specified period of time (<120 seconds). The one or more curing agents can be added using any suitable technique, such as by injection as a solution in a compatible process oil, as a neat solid, as a neat melt, or as a masterbatch, for example.

One or more fillers or other additives can be introduced to the melt either before, during or after the cure. The additives, fillers or other compounds, which may interfere with the curing agents, should be added after curing reaches the desired level. Preferably, those additives are added to the melt as a slurry or paste in a compatible rubber process oil. Powder blends or masterbatches of these components can be prepared in a wax or polymer carrier to facilitate metering and mixing. Following the cure and sufficient mixing of the melt, the melt blend can be processed to form an elastomeric structure using any one or more of the following techniques: milling, chopping, extrusion, pelletizing, injection molding, or any other desirable technique. Additional details for making TPV compositions are described in U.S. Pat. No. 4,594,390.

SPECIFIC EMBODIMENTS

Various specific embodiments are described below, at least some of which are also recited in the claims. For example, at least one specific embodiment is directed to an automotive sealant composite structure. In one or more embodiments, the composite structure includes a first piece (i.e. first structure) adhered to a second piece (i.e. second structure). In one or more embodiments, the first piece is a corner piece and the second piece is a straight piece. In one or more embodiments, at least one end of the first piece is adhered to an end of the second piece such that the first piece and the second piece are adhered end to end, or "butt-welded" as is known in the art.

In one or more embodiments, the first piece includes a first elastomeric component that includes an at least partially crosslinked rubber component and a first olefinic thermoplastic resin component. The first elastomeric component also includes a second olefinic thermoplastic resin component that includes a propylene copolymer that has (i) 60 wt % or more units derived from propylene, (ii) isotactically arranged propylene derived sequences and (iii) a heat of fusion less than 45 J/g.

In one or more of the embodiments identified above or elsewhere herein, the at least partially crosslinked rubber component includes thermoset EPR. In one or more of the embodiments identified above or elsewhere herein, the at least partially crosslinked rubber component includes thermoset EPDM. In one or more of the embodiments identified above or elsewhere herein, the at least partially crosslinked rubber component is present in the amount of from about 5 weight percent (wt %) to about 85 wt % based on the total weight of the first piece. In one or more of the embodiments identified above or elsewhere herein, the at least partially crosslinked rubber component is present in the amount of less than 70 wt % or less than 50 wt % based on the total weight of the first piece.

In one or more of the embodiments identified above or elsewhere herein, the first olefinic thermoplastic resin component is present in the amount of from about 15 wt % to about 95 wt % based on the total weight of the first piece. In one or more of the embodiments identified above or elsewhere herein, the first olefinic thermoplastic resin component is present in the amount of more than 30 wt % or more than 50 wt % based on the total weight of the first piece.

In one or more of the embodiments identified above or elsewhere herein, the propylene copolymer is present in the amount of from about 1 wt % to about 50 wt % based on the total weight of the first piece. In one or more of the embodiments identified above or elsewhere herein, the propylene copolymer is present in the amount of from about 5 wt % to about 15 wt % based on the total weight of the first piece. In one or more of the embodiments identified above or elsewhere herein, the propylene copolymer is present in the amount of from about 10 wt % to about 40 wt % based on the total weight of the first piece.

In one or more embodiments identified above or elsewhere herein, the propylene copolymer is a propylene/ethylene copolymer having an ethylene content of greater than 8 wt % and up to about 30 wt % based on total weight of the propylene copolymer. In one or more embodiments identified above or elsewhere herein, the propylene copolymer is a propylene/ethylene copolymer having an ethylene content of from about 10 wt % to about 15 wt % based on total weight of the propylene copolymer.

In one or more embodiments identified above or elsewhere herein, the first elastomeric component includes of from about 10% by weight to about 60% by weight of one or more additive oils, based on total weight of the first piece. More preferably, the first elastomeric component includes of from about 25% by weight to about 40% by weight of one or more additive oils, based on total weight of the first piece. In one or more embodiments identified above or elsewhere herein, the first elastomeric component includes of from about 0.1% by weight to about 5% by weight of one or more curatives, based on total weight of the first piece. More preferably, the first elastomeric component includes of from about 0.2% by weight to about 1.5% by weight of one or more curatives, based on total weight of the first piece. In one or more embodiments identified above or elsewhere herein, the first elastomeric component includes of from about 1% by weight to about 25% by weight of one or more fillers, based on total weight of the first piece. More preferably, the first elastomeric component includes of from about 2% by weight to about 15% by weight of one or more fillers, based on total weight of the first piece.

In one or more embodiments identified above or elsewhere herein, the first piece has a Shore A Hardness of 75 or less. In one or more embodiments identified above or elsewhere herein, the first piece has a Shore A Hardness of 70 or less, or 65 or less, or 60 or less. In one or more embodiments identified above or elsewhere herein, the first piece has a Shore A Hardness of from 50 to 70.

In one or more embodiments identified above or elsewhere herein, the second piece is a thermoplastic elastomer or thermoplastic vulcanizate. In one or more embodiments identified above or elsewhere herein, the second piece includes a thermoset rubber, thermoplastic, or thermoplastic rubber. Preferably, the second piece includes a second elastomeric component. In one or more embodiments identified above or elsewhere herein, the second elastomeric component includes one or more thermoset ethylene copolymer rubbers and includes less than 5 wt % of an olefinic thermoplastic resin. In one or more embodiments identified above or elsewhere herein, the second elastomeric component includes EPDM. In one or more embodiments identified above or elsewhere herein, the second elastomeric component includes EPR.

In one or more of the embodiments identified above or elsewhere herein, the adhesion between the first piece and the second piece is about 2.5 MPa or more. In one or more of the embodiments identified above or elsewhere herein, the adhesion between the first piece and the second piece is about 3.0 MPa or more. In one or more of the embodiments identified above or elsewhere herein, the adhesion between the first piece and the second piece is about 3.5 MPa or more. In one or more of the embodiments identified above or elsewhere herein, the adhesion between the first piece and the second piece is about 3.6 MPa or more. In one or more of the embodiments identified above or elsewhere herein, the adhesion between the first piece and the second piece is about 4.0 MPa or more.

Articles

In one or more embodiments, the first piece is at least partially adhered or otherwise attached to the second piece at conditions sufficient to obtain good adhesion therebetween. The two pieces can be at least partially adhered to one another by extrusion, injection molding, blow molding, or compression molding techniques to form a composite article or structure. Preferably, at least one end of the first piece is adhered to an end of the second piece such that the first piece and the second piece are adhered end to end, or butt-welded.

Illustrative composite structures include, but are not limited to, vehicle parts, especially interior and exterior parts, for automobiles, airplanes, train cars, All Terrain Vehicles (ATVs), snowmobiles, boats, jet skis, motorcycles, and any other 2, 4 or more wheeled vehicles. Specific vehicle parts include, but are not limited to, exterior weather seals such as molded corners, molded end caps, glass run channels, trunk seals, tailgate seals, cowl seals, gap fillers, glass encapsulation, cut line seals, door seals, hood-to-radiator seals, windshield seals, sunroof seals, roof line seals, rear window seals, rocker panels, sashes, and belt-line seals, for example. A particular belt-line seal is shown and described in U.S. Pat. No. 6,368,700. Other particular automotive exterior weather seals can be found at http:\\www.santoprene.com.

EXAMPLES

The following examples illustrate the surprising adhesion between a first elastomeric structure that contains a propylene copolymer and a second elastomeric structure that does not contain a propylene copolymer. For purposes of convenience, various specific test procedures are identified for determining properties such as adhesion and Shore A Hardness. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

In each of the samples shown and described below, the elastomeric samples that included the propylene copolymer showed a surprising increase in adhesion to an EPDM substrate compared to a similar elastomeric sample that did not contain the propylene copolymer. Moreover, the addition of 10% to 30% by weight of the propylene copolymer did not affect the Shore A hardness of the elastomeric sample. This was also surprising and unexpected. One would have thought that an increase in thermoplastic content would have produced a stiffer, harder material; however, this was not the case. Instead, as much as 30% more thermoplastic was added to these elastomeric samples without an increase in Shore A hardness. Finally, the elastomeric samples showed an increase in adhesion to the EPDM substrate using different types of thermoplastic resin components, including homo polymers, terpolymers, impact copolymers and random copolymers of propylene.

Each first elastomer composition (Elastomers 1-4) was made by feeding all materials into a twin screw mixer and dynamically vulcanizing the rubber component by heating the mixture above the melting points of the thermoplastic components (150° C.-200° C.) while concurrently mixing the molten materials.

TABLE 1

Formulations of the first elastomeric structure in percent by total weight.

| Materials | Elastomer Sample 1A | Elastomer Sample 1B | Elastomer Sample 2A | Elastomer Sample 2B |
|---|---|---|---|---|
| Rubber Masterbatch (see Table 2) | A | A | B | B |
| Rubber Masterbatch | 60 | 51 | 77 | 70 |
| Thermoplastic (see Table 3) | 37 | 16 | 21 | 18 |
| Propylene Copolymer | — | 30 | — | 10 |
| Carbon black filler | 3 | 3 | 2 | 2 |

TABLE 1-continued

Formulations of the first elastomeric structure in percent by total weight.

| Materials | Elastomer Sample 3A | Elastomer Sample 3B | Elastomer Sample 4A | Elastomer Sample 4B |
|---|---|---|---|---|
| Rubber Masterbatch (see Table 2) | Type A | Type A | Type C | Type C |
| Rubber Masterbatch | 76 | 69 | 77 | 70 |
| Thermoplastic (see Table 3) | 21 | 18 | 21 | 18 |
| Propylene Copolymer | — | 10 | — | 10 |
| Carbon black filler | 2 | 2 | 2 | 2 |

The formulation of the rubber masterbatch is shown below in Table 2.

TABLE 2

Rubber masterbatch.

| Ingredients | Description | Type A (phr) | Type B (phr) | Type C (phr) |
|---|---|---|---|---|
| ExxonMobil V3666 (75 phr oil) | EPDM | 175 | — | 175 |
| ExxonMobil VX4779 (90 phr oil) | EPDM | — | 190 | — |
| Burgess Icecap K | Clay | 42 | 12 | 12 |
| Zinc Oxide | Cure synergist | 2 | 2 | 2 |
| Stannous Chloride | Catalyst | 1.26 | 1.26 | 1.26 |
| SP1045 | Curing resin | 4.5 | 5.26 | 5.26 |
| Sunpar 150M | Oil | 88 | 84 | 99 |

ExxonMobil V3666 is available from ExxonMobil and is an ethylene-propylene-(ethylidene-norbornene) EPDM terpolymer having a Mooney viscosity (ML (1+4) @ 125° C.) of 50, an ENB content of 4.2 wt %, an ethylene content of 63%, and 75 phr paraffinic oil.

ExxonMobil VX4779 is available from ExxonMobil and is ethylene-propylene-(ethylidene-norbornene) EPDM terpolymer having a Mooney viscosity ML (1+4) @ 125° C. of 53, an ENB content of 4.8 wt %, and an ethylene content of 66.3% and 90 phr paraffinic oil.

Burgess Icecap K is available from Burgess and is a calcined clay having an average particle size of about 1.5 microns.

SP1045 is available from Schenectady and is a para-tertiary octyl phenolic resin having a melting point of about 147° F.

Sunpar 150M is available from Sunoco and is a paraffinic oil with a viscosity CST 40° C. of 110.

The formulations of the olefinic thermoplastic resin components are shown in Table 3.

TABLE 3

Formulations of olefinic thermoplastic resin component in percent by total weight.

| Materials | Elastomer Sample 1A | Elastomer Sample 1B | Elastomer Sample 2A | Elastomer Sample 2B |
|---|---|---|---|---|
| Equistar 51S07A PP | — | 3 | — | — |
| Sunoco F-180-A PP | 3 | — | — | — |
| Sunoco FP300F | 5 | 5 | 4 | 3 |
| Basell Adflex KS-359P | 29 | 8 | — | — |
| Fina EOD 94-21 | — | — | 17 | 15 |
| Fina Adsyl 5C30F | — | — | — | — |

| Materials | Elastomer Sample 3A | Elastomer Sample 3B | Elastomer Sample 4A | Elastomer Sample 4B |
|---|---|---|---|---|
| Equistar 51S07A PP | — | — | — | — |
| Sunoco F-180-A PP | — | — | — | — |
| Sunoco FP300F | 4 | 3 | 4 | 3 |
| Basell Adflex KS-359P | — | — | — | — |
| Fina EOD 94-21 | 17 | 15 | — | — |
| Fina Adsyl 5C30F | — | — | 17 | 15 |

Equistar 51S07A PP is available from Sunoco and is a homo polypropylene having a 0.8 MFI. Sunoco F-180-A PP is also available from Sunoco and is a homo polypropylene having a 20 MFI. Sunoco FP300F is also available from Sunoco and is a homo polypropylene having a 30 MFI.

Basell Adflex KS-359P is available from Basell and is an impact copolymer with a random polypropylene matrix having 67 wt % elastomer content and a MFI of 12.

Fina EOD 94-21 is available from Atofina and is a random polypropylene having about 5 wt % ethylene and a 5 MFI.

Fina Adsyl 5C30F is available from Atofina and is a terpolymer of ethylene, propylene, and butene with a MFI of 5.5.

The propylene copolymer component was a metallocene catalysed polypropylene/polyethylene random copolymer having 10% by total weight of ethylene. This propylene copolymer blend had a Mooney viscosity of 11 as measured according to ASTM D 1646, and a melting point of less than 100° C. The propylene copolymer component was prepared in a 1 liter internal volume Continuous Flow Stirred Tank Reactor. Hexane was used as the solvent. The liquid full reactor had a variable residence time of approximately 9 to 15 minutes and the pressure was maintained at 700 kPa. A mixed feed of hexane, ethylene and propylene was pre-chilled to approximately −30° C. to remove the heat of polymerization before entering the reactor. The solution of catalyst/activator in toluene and the scavenger in hexane were separately and continuously added to the reactor to initiate the polymerization. The reactor temperature was maintained around 70° C.

Hexane at 3.56 kg/hr was premixed with both ethylene at rate 60 g/hr and propylene at rate 812 g/hr and fed to the reactor. The polymerization catalyst, dimethyl silyl bridged bis-indenyl hafnium dimethyl, was activated in situ in 1:1 molar ratio with N,N'-Dimethyl anilinium-tetrakis (heptafluoro-1-napthyl)borate and introduced into the polymerization reactor at the rate of 0.0135 g/hr. A dilute solution of triisobutyl aluminum was introduced into the reactor as a scavenger for catalyst terminators. A rate of approximately 1.11 mole of scavenger per mole of catalyst was adequate for this polymerization. After five residence times of steady polymerization, a representative sample of the copolymer produced in this polymerization was collected. The solution of the copolymer was withdrawn from the top, and then steam distilled to isolate the copolymer. The polymerization rate was measured to be about 0.26 kg/hr. The copolymer produced in this polymerization was analyzed for ethylene content by FTIR. The molecular weight averages were measured by GPC. Crystallinity was measured by DSC and the amount of mm triads of propylene residues in the copolymer chain was determined by 13 C NMR.

The second elastomer composition was a fully cured thermoset EPDM rubber and was compounded in a tangential type internal mixer (Farrel 1.6 L mixer). A masterbatch was mixed in a first pass and then finalized with addition of the curatives in the second pass. The formulation of the second elastomer composition is shown in Table 4. The theological properties of the second elastomeric composition are shown below in Table 5.

TABLE 4

Second elastomer composition formulation in weight percent.

| | wt. % |
|---|---|
| Vistalon ®8700 | 100 |
| Spheron 5000 | 130 |
| Omya BSH (Whiting) | 40 |
| Flexon 815 | 60 |
| PEG 3350 | 2 |
| Zincoxide active | 3 |
| Stearic acid | 1 |
| Rhenogran CaO-80 | 7 |
| Sulfur | 1.5 |
| CBS | 1.4 |
| ZBEC (70%) | 1 |
| Rhenocure TP/G (50%) | 2 |
| Vulkalent E/C | 0.3 |

Vistalon® 8700 is an ethylene-propylene-(ethylidene-norbornene) EPDM terpolymer having a Mooney viscosity (ML (1+4) at 125° C. of 78, an ethylene content of 63 wt %, and an ethylidene-norbornene content of 8 wt %, which is available from ExxonMobil Chemical Europe, Brussels, Belgium.

Spheron 5000 is carbon black available from Cabot Corp.

Omya BSH (Whiting) is calcium carbonate available from Omya.

Flexon 815 is paraffinic petroleum oil, ASTM type 104B and is available from ExxonMobil.

PEG 3350 is polyethylene glycol with a weight average molecular weight from 3015 to 3685, available from Dow Chemical.

Zincoxide active is precipitated zinc oxide available from Bayer.

Rhenogran CaO-80 is calcium oxide available from Rhein Chemie.

CBS is N-cyclohexyl-2-benzothiazole sulfenamide (CAS 95-33-0).

ZBEC (70%) is zinc dibenzyldithiocarbamate (CAS 14726-36-4).

Rhenocure TP/G (50%) is an dithiophosphate accelerator available from Rhein Chemie.

Vulkalent E/C is n-phenyl-n-(trichloro-methyl-sulfenyl)-benzene sulfonamide available from Lanxess.

TABLE 5

Rheological and physical properties of the second elastomeric composition.

| Monsanto MDR, 180° C., ±0.5° arc: | |
|---|---|
| ML, dNm | 2.3 |
| MH, dNm | 21.4 |
| ts2, m.m | 0.44 |
| tc90, m.m | 1.51 |
| Rate dNm/min. | 30.5 |

TABLE 5-continued

Rheological and physical properties of the second elastomeric composition.

| Mooney viscosity, 100° C., ML 1 + 4: | |
|---|---|
| MU | 82 |
| MOONEY Scorch, 125° C., MS: | |
| Ts2, m.m | 5.73 |
| Ts5, m.m | 6.85 |
| Ts10, m.m | 7.95 |
| min.MU | 32.0 |
| Physical properties, UHF cure: | |
| Modulus 100%, MPa | 4.9 |
| Tensile, MPa | 11.9 |
| Elongation % | 280 |
| Energy at break, J | 5.1 |
| Compression Set 22 h 70° C., cure 180° C.: | |
| % set | 18 |

The second elastomer composition was hot air cured at 230° C. and then extruded. The second elastomer composition was extruded at a line speed of 3 m/min into a flat strip (45 mm wide×3 mm thick) at 100° C. to form the second elastomeric structure. The second elastomeric structure was then freshly cut into strip (3 mm thick) and inserted into a molding. The molten first elastomer composition was injected into the mold to adhere to the second elastomeric structure, a composite structure. The adhesion between the first and second elastomeric structures was then tested.

The adhesion testing of the composite structure was performed by cutting a series of dumbbells having a butt-joint geometry, of which the top half was the first elastomeric structure and the bottom half was the second elastomeric structure. A die dumbbell ISO Type S2 was used to cut the dumbbells. The dumbbells were conditioned for 24 hours at the specified test temperature.

The adhesion level was measured using an adaptation of a ASTM D-638 norm which describes the procedure to determine the tensile properties of a plastic. Specifically, the adhesion level was measured by pulling the ends of the dumbbell samples in a tensometer at the specified test conditions at a speed of 4 inches per minute. The results are shown in Table 6.

TABLE 6

Test results

| | Elastomer Sample 1A | Elastomer Sample 1B | Elastomer Sample 2A | Elastomer Sample 2B |
|---|---|---|---|---|
| Adhesion, MPa | 3.1 | 4.7 | 2.7 | 4.5 |
| Shore A Hardness of first structure | 72 | 71 | 65 | 67 |
| Shore A Hardness of second structure | 60 | 60 | 60 | 60 |

| | Elastomer Sample 3A | Elastomer Sample 3B | Elastomer Sample 4A | Elastomer Sample 4B |
|---|---|---|---|---|
| Adhesion, MPa | 3 | 3.9 | 2.4 | 3.6 |
| Shore A Hardness of first structure | 64 | 66 | 66 | 68 |
| Shore A Hardness of second structure | 60 | 60 | 60 | 60 |

Each of the inventions have been described in greater detail above, including specific embodiments, versions and examples, but the inventions are not limited to these embodiments, versions or examples, which are included to enable a person having ordinary skill in the art to make and use the inventions, when the information in this patent is combined with available information and technology.

Certain composition features have been described using a set of numerical upper limits and a set of numerical lower limits. It should be appreciated that ranges from any lower limit to any upper limit are contemplated unless otherwise indicated. Certain lower limits, upper limits and ranges appear in one or more claims. All numerical values are "about" or "approximately" the indicated value, and take into account experimental error and variations that would be expected by a person having ordinary skill in the art. Furthermore, all patents, test procedures, and other documents cited in this application are fully incorporated by reference to the extent such disclosure is not inconsistent with this application and for all jurisdictions in which such incorporation is permitted.

Various terms as used herein have been defined above. To the extent a term used in a claim was not defined, it should be given the broadest definition persons in the pertinent art have given that term as reflected in one or more printed publications or issued patents.

What is claimed is:

1. An automotive sealant composite structure, comprising:
   a first piece comprising:
      a first elastomeric component that includes an at least partially crosslinked rubber,
      a first olefinic thermoplastic resin component, and
      a second olefinic thermoplastic resin component that includes a propylene copolymer that has
         (i) 60 wt % or more units derived from propylene,
         (ii) isotactically arranged propylene derived sequences and
         (iii) a heat of fusion less than 45 J/g, and
   a second piece at least partially adhered to the first piece, the second piece comprising a second elastomeric component that comprises one or more thermoset ethylene copolymer rubbers and includes less than 5 wt % of an olefinic thermoplastic resin.

2. The composite structure of claim 1, wherein the first elastomeric component comprises from 1 wt % to 50 wt % of the propylene copolymer based on total weight of the first piece.

3. The composite structure of claim 1, wherein the first elastomeric component comprises of from 10 wt % to 40 wt % of the propylene copolymer based on total weight of the first piece.

4. The composite structure of claim 1, wherein the first elastomeric component comprises of from 5 wt % to 85 wt % of the at least partially crosslinked rubber based on total weight of the first piece.

5. The composite structure of claim 1, wherein the at least partially crosslinked rubber is EPDM.

6. The composite structure of claim 1, wherein the at least partially crosslinked rubber is EPR.

7. The composite structure of claim 1, wherein the propylene copolymer is a propylene/ethylene copolymer having an ethylene content of greater than 8 wt % and up to about 30 wt % based on total weight of the propylene copolymer.

8. The composite structure of claim 1, wherein the propylene copolymer is a propylene/ethylene copolymer having an ethylene content of from about 10 wt % to about 15 wt % based on total weight of the propylene copolymer.

9. The composite structure of claim 1, wherein the first piece has a Shore A Hardness of 75 or less.

10. The composite structure of claim 1, wherein the first piece has a Shore A hardness of less than 75 and the adhesion between the first piece and the second piece is about 3.0 MPa or more.

11. The composite structure of claim 1, wherein the adhesion between the first piece and the second piece is about 3.5 MPa or more.

12. The composite structure of claim 1, wherein:
   i) the first piece comprises at least partially crosslinked EPDM, random polypropylene and 5 wt % or more of the propylene copolymer based on total weight of the first piece; and
   ii) the adhesion between the first piece and the second piece is about 3.6 MPa or more.

13. An automotive sealant composite structure, comprising:
   a corner piece in an automotive window seal construction comprising:
      a first elastomeric component that includes an at least partially crosslinked rubber,
      a first olefinic thermoplastic resin component, and
      a second olefinic thermoplastic resin component that includes a propylene copolymer that has
         (i) 60 wt % or more units derived from propylene,
         (ii) isotactically arranged propylene derived sequences, and
         (iii) a heat of fusion less than 45 J/g, and
   a straight piece at least partially adhered to the corner piece, the straight piece comprising a second elastomeric component that comprises one or more thermoset ethylene copolymer rubbers and includes less than 5 wt % of an olefinic thermoplastic resin.

14. The composite structure of claim 13, wherein the corner piece has a Shore A Hardness of 75 or less.

15. The composite structure of claim 13, wherein the adhesion between the corner piece and the straight piece is about 3.0 MPa or more.

16. The composite structure of claim 13, wherein the propylene copolymer is a propylene/ethylene copolymer having an ethylene content of greater than 8 wt % and up to about 30 wt % based on total weight of the propylene copolymer.

17. A vehicular sealant composite structure, comprising:
   a first piece comprising:
      a first elastomeric cornponent that includes an at least partially crosslinked rubber,
      a first olefinic thermoplastic resin component, and
      a second olefinic thermoplastic resin component that includes a propylene copolymer that has
         (i) 60 wt % or more units derived from propylene,
         (ii) isotactically arranged propylene derived sequences and
         (iii) a heat of fusion less than 45 J/g, and
   a second piece at least partially adhered to the first piece, the second piece comprising a second elastomeric component that comprises one or more thermoset ethylene copolymer rubbers and includes less than 5 wt % of an olefinic thermoplastic resin, wherein the sealant system is selected from the group consisting of molded corners, molded end caps, glass run channels, trunk seals, tailgate seals, cowl seals, gap fillers, glass encapsulation, cut line seals, door seals, hood-to-radiator seals, windshield seals, sunroof seals, roof line seals, rear window seals, rocker panels, sashes, and belt-line seals.

18. The composite structure of claim 17, wherein the first piece has a Shore A Hardness of 75 or less.

19. The composite structure of claim 17, wherein the adhesion between the first piece and the second piece is about 3.0 MPa or more.

* * * * *